United States Patent
DeRose et al.

(10) Patent No.: US 8,286,135 B2
(45) Date of Patent: Oct. 9, 2012

(54) PERFORMANCE VISUALIZATION INCLUDING HIERARCHICAL DISPLAY OF PERFORMANCE DATA

(75) Inventors: Luiz DeRose, Mendota Heights, MN (US); Dean T. Johnson, Mendota Heights, MN (US)

(73) Assignee: Cray Inc., Seattle, WA (US)

( * ) Notice: Subject to any disclaimer, the term of this patent is extended or adjusted under 35 U.S.C. 154(b) by 1106 days.

(21) Appl. No.: 11/874,017

(22) Filed: Oct. 17, 2007

(65) Prior Publication Data

US 2008/0092121 A1    Apr. 17, 2008

Related U.S. Application Data

(60) Provisional application No. 60/829,823, filed on Oct. 17, 2006.

(51) Int. Cl.
*G06F 9/44* (2006.01)

(52) U.S. Cl. .................................................. 717/125

(58) Field of Classification Search ............... 717/125
See application file for complete search history.

(56) References Cited

U.S. PATENT DOCUMENTS

| | | | |
|---|---|---|---|
| 6,934,935 B1 * | 8/2005 | Bennett et al. | 717/127 |
| 7,093,234 B2 * | 8/2006 | Hibbeler et al. | 717/124 |
| 7,433,526 B2 * | 10/2008 | Apostolopoulos et al. | 382/239 |
| 7,734,661 B2 * | 6/2010 | Jordan et al. | 707/803 |
| 7,877,737 B2 * | 1/2011 | Austin et al. | 717/132 |
| 2003/0142202 A1 * | 7/2003 | Bowman | 348/14.09 |
| 2005/0132336 A1 * | 6/2005 | Gotwals et al. | 717/127 |
| 2008/0127107 A1 * | 5/2008 | Kosche et al. | 717/128 |

OTHER PUBLICATIONS

Simone Sbaraglia "Present and Future of the IBM High Performance Computing Toolkit", Jun. 2005, IBM.*
Smith et al. "Profiling H2MOL on an IBM p690+ Cluster", Oct. 2004, The University of Edinburgh and Andrew Sunderland.*
Luiz DeRose "Performance Visualization on the Cray XT3", Oct. 2005, Cray Inc.*
Arnold, Spring 1995, "Performance Optimization of Parallel Programs-Tracing, Zooming, Understanding".*
Becker et al. "Visualizing Network Data", Mar. 1995, IEEE, vol. 1 No. 1.*

* cited by examiner

*Primary Examiner* — Wei Zhen
*Assistant Examiner* — Junchun Wu
(74) *Attorney, Agent, or Firm* — Perkins Coie LLP

(57) ABSTRACT

Systems and methods provide a display indicating performance characteristics of a computer application. The display may include a call graph having nodes that represent subunits of the application. A first set of statistics for the subunit may be represented in the size or dimensions of the node. A second set of statistics may be displayed in the interior of the node. A third set of statistics may be displayed in response to selecting the node.

21 Claims, 4 Drawing Sheets

US 8,286,135 B2

PERFORMANCE VISUALIZATION INCLUDING HIERARCHICAL DISPLAY OF PERFORMANCE DATA

RELATED APPLICATION

This application claims the benefit of U.S. Provisional Patent Application Ser. No. 60/829,823 filed Oct. 17, 2006, which is incorporated herein by reference and made a part hereof.

FIELD

The embodiments of the present invention relate to the display of performance data for a software application. More specifically, the embodiments relate to a hierarchical display of performance data.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever. Copyright © 2005, 2006 Cray Inc.

BACKGROUND

Computer software applications and programs may be very complex, and may be run in complex hardware environments such as multiprocessor environments. Due to the complexity of the software or the runtime environment, it can be difficult to determine performance issues such as hotspots or bottlenecks in computer programs and applications. Previous systems have attempted to solve the problem by providing call graphs that represent certain aspects of the execution of an application. However, the call graphs of previous systems have been limited in the number and type of statistics represented in the call graph.

SUMMARY

Systems and methods provide a display indicating performance characteristics of a computer application. The display may include a call graph having nodes that represent subunits of the application. A first set of statistics for the subunit may be represented in the size or dimensions of the node. A second set of statistics may be displayed in the interior of the node.

A further aspect of the systems and methods includes displaying a third set of statistics in response to selecting the node.

A still further aspect of the systems and methods includes highlighting a node to indicate a performance characteristic.

DETAILED DESCRIPTION

In the following detailed description, reference is made to the accompanying drawings that form a part hereof, and in which is shown by way of illustration, specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

In the Figures, the same reference number is used throughout to refer to an identical component which appears in multiple Figures. Signals and connections may be referred to by the same reference number or label, and the actual meaning will be clear from its use in the context of the description.

The functions or algorithms described herein are implemented in hardware, and/or software in embodiments. The software comprises computer executable instructions stored on computer-readable media such as memory or other types of storage devices. The term "computer-readable media" is also used to represent software-transmitted carrier waves. Further, such functions correspond to modules, which are software, hardware, firmware, or any combination thereof. Multiple functions are performed in one or more modules as desired, and the embodiments described are merely examples. A digital signal processor, ASIC, microprocessor, or any other type of processor operating on a system, such as a personal computer, server, a router, or any other device capable of processing data including network interconnection devices executes the software.

Some embodiments implement the functions in two or more specific interconnected hardware modules or devices with related control and data signals communicated between and through the modules, or as portions of an application-specific integrated circuit. Thus, the example process flow is applicable to software, firmware, and hardware implementations.

Figure 1:
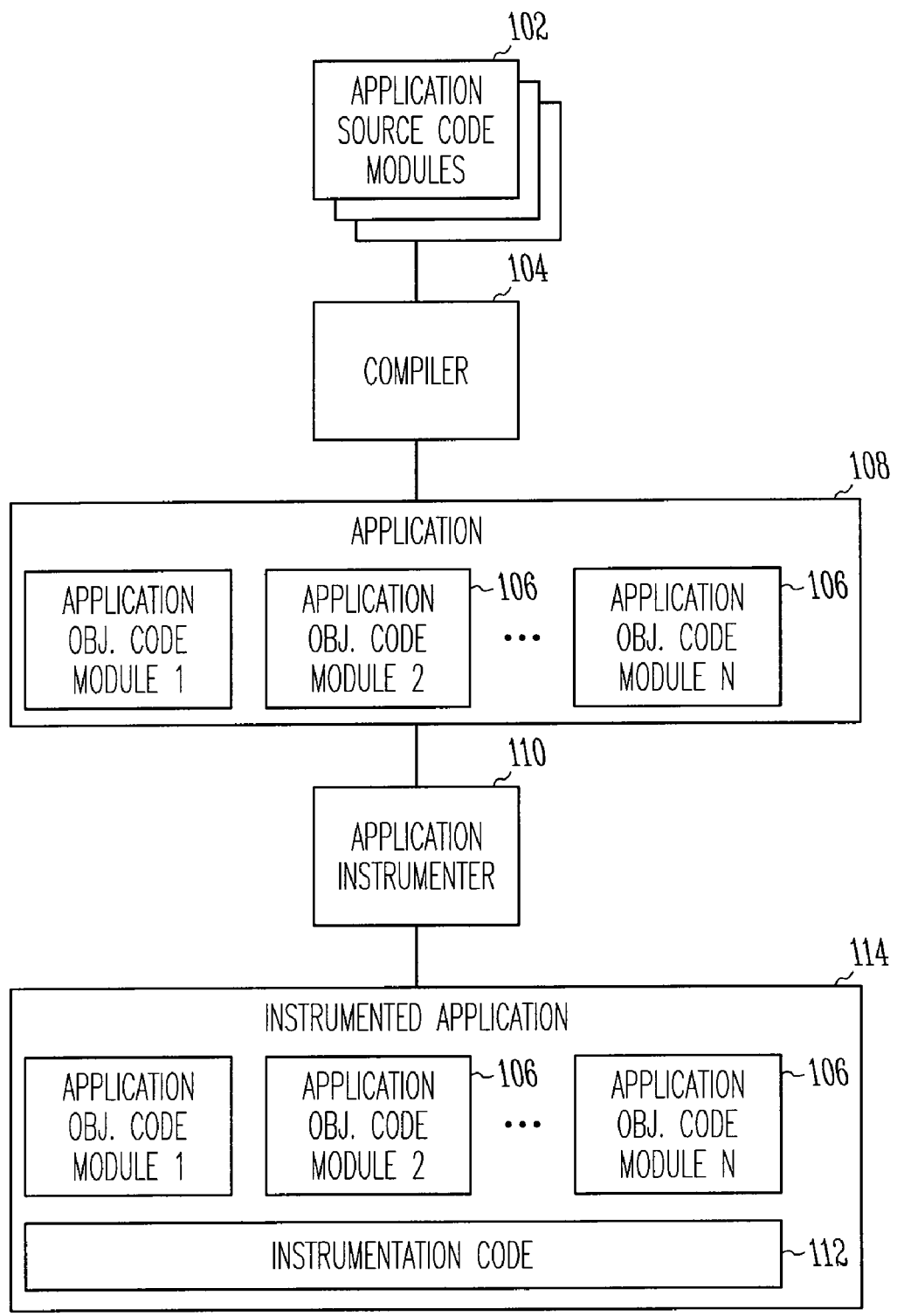
FIG. 1 illustrates example components for building a software application according to embodiments of the invention.

FIG. 1 illustrates example components of a system 100 for building a software application according to embodiments of the invention. In some embodiments, the system includes a compiler 104 and an application instrumenter 110. Compiler 104 reads one or more application source code modules 102 as input and produces application 108 as output. Application 108 may include object code modules 106 that correspond to source code modules 102. Application 108 may include library modules or references to dynamically loaded library modules that are loaded when the application is executed. Compiler 104 may include or invoke a linker or loader to complete the building of an application 108. Source modules 102 may be in any programming language, including C, C++, FORTRAN etc.

In some embodiments, application instrumenter 110 reads an application 108 as input and inserts instrumentation code 112 into the application to produce an instrumented application 114. In particular embodiments the application instrumenter 110 is the "pat_build" program available from Cray, Inc. Instrumentation code 112 may include code that produces application performance information for an application. Such performance information may include time values (e.g. entry time, exit time, and/or total time) and hardware counters associated with function entry points.

In alternative embodiments, the compiler may be directed to include instrumentation code 112 in an application 108. In further alternative embodiments, a software developer may insert instrumentation code or calls to instrumentation code directly into the source code modules 102.

Figure 2:
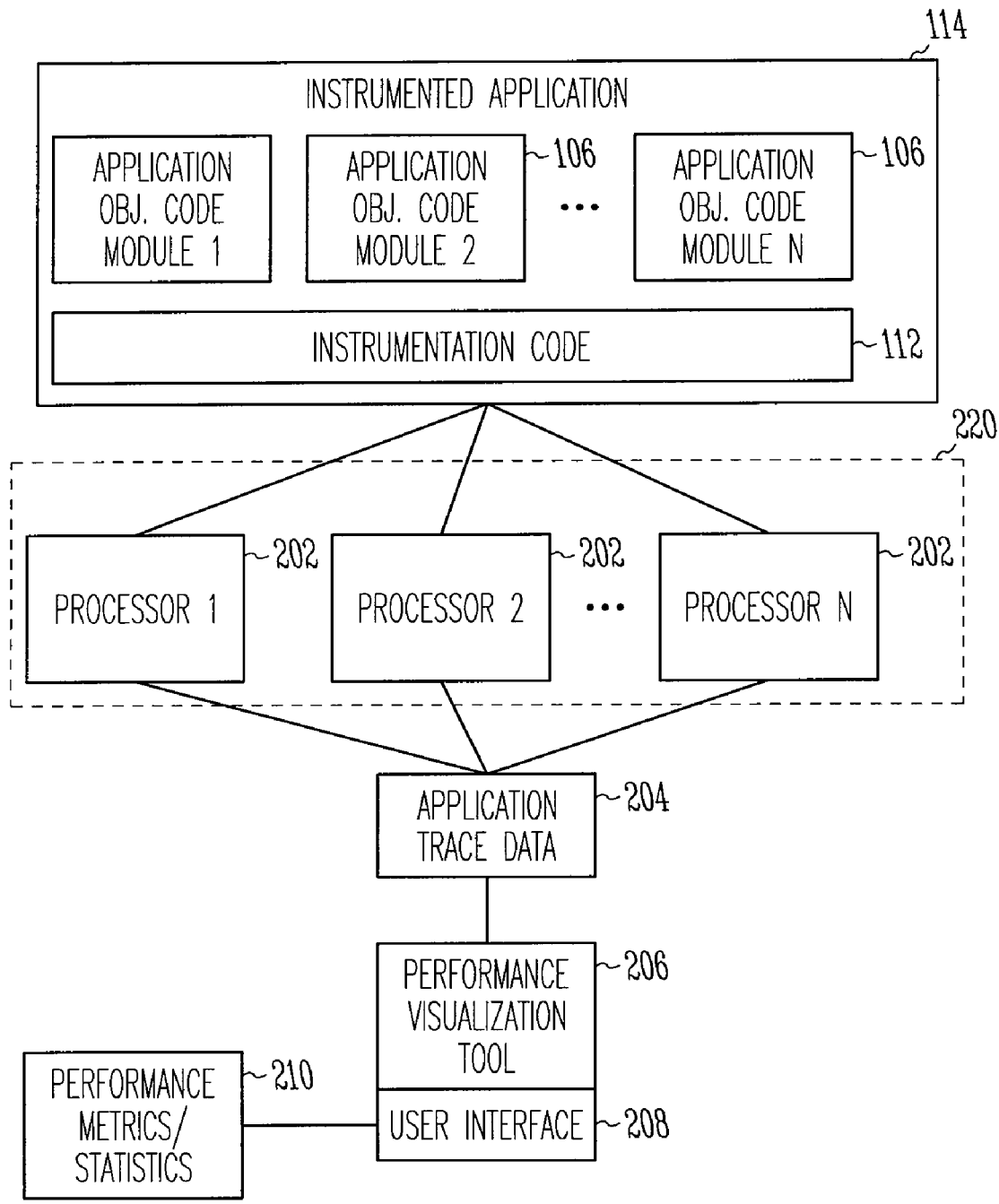
FIG. 2 illustrates components used to visualize application performance data according to embodiments of the invention.

While FIG. 1 illustrates a system for creating an application containing instrumentation code, FIG. 2 illustrates a system to visualize the performance of an instrumented application.

FIG. 2 illustrates components of a system 200 used to visualize application performance data according to embodiments of the invention. In some embodiments, the system includes an instrumented application 114, a hardware execution environment 220, and a performance visualization tool 206. Instrumented application 114 comprises an application created as described above in FIG. 1.

In some embodiments, hardware execution environment 220 is a multiple processor hardware environment. There may be four, tens, hundreds, or even thousands of processors 202 in the hardware execution environment 220. Processors 202 may be grouped into nodes having multiple processors, for example, four processors. Alternatively, processors 202 may be distributed across a number of different systems and communicably coupled via a network. In particular embodiments, hardware execution environment 220 may be a Cray XT3 from Cray, Inc. Details on a hardware execution environment 220 used in further particular embodiments may be found in the document entitled "The BlackWidow High-Radix Clos Network" which is attached as Appendix A to U.S. Provisional Patent Application Ser. No. 60/829,823, filed Oct. 17, 2006 and entitled "PERFORMANCE VISUALIZATION INCLUDING HIERARCHICAL DISPLAY OF PERFORMANCE DATA", which has been previously incorporated by reference.

In general, a processor 202 may be any type of processor, including scalar processors, vector processors, central processing units or any other logic circuit that can execute instructions and manipulate data.

Application 114 may be run on one or more of the processors in hardware execution environment 220. Application 114 may be composed of one or more processes, threads or other execution units that are distributed across one or more processors 202 for execution. Further, the modules or functions of application 114 may be executed across one or more processors 202 in hardware execution environment 220.

As application 114 is being executed, application performance data 204 is created. In some embodiments, application performance data 204 comprises time data, hardware counters and/or other performance metrics associated with one or more function entry and/or exit points for application 114. The time data may include entry time, exit time or execution time for a function. Other performance metrics include cache misses, number of calls, TLB (Translation Lookaside Buffer) misses, I/O counters, message counters, message sizes and/or bandwidth metrics. The application performance data 204 may be saved in a file for later analysis. In some embodiments, application performance data 204 may be formatted as an XML file.

After application 114 has finished execution, a performance visualization tool 206 may read the application performance data 204 to determine various performance metrics and statistics 210 regarding application 114. In particular embodiments, performance visualization tool 206 comprises the Cray Apprentice2 performance visualization tool available from Cray, Inc. In some embodiments, performance visualization tool 206 provides a call graph display of functions and/or modules that are executed during the run-time of application 114. In some embodiments, the call graph includes a set of nodes that may be presented in a hierarchy in the call graph. The call graph may be expressed as a directed graph, which represents the path the application program 114 took during execution. The nodes of the call graph may be represented by rectangles. The dimensions of each node, which represent a subroutine or a code region in the application, may represent a first set of metrics or statistics for a subroutine, function, or code region, for example, execution time. At a second level of the hierarchy, each node in the call graph display may display a second set of statistics or metrics related to the subroutine, function or region represented by the node. Further details on a call graph provided by example embodiments of the invention are provided below with reference to FIG. 4, while further details on the operation of performance visualization tool 206 are provided below with reference to FIG. 3.

Figure 3:
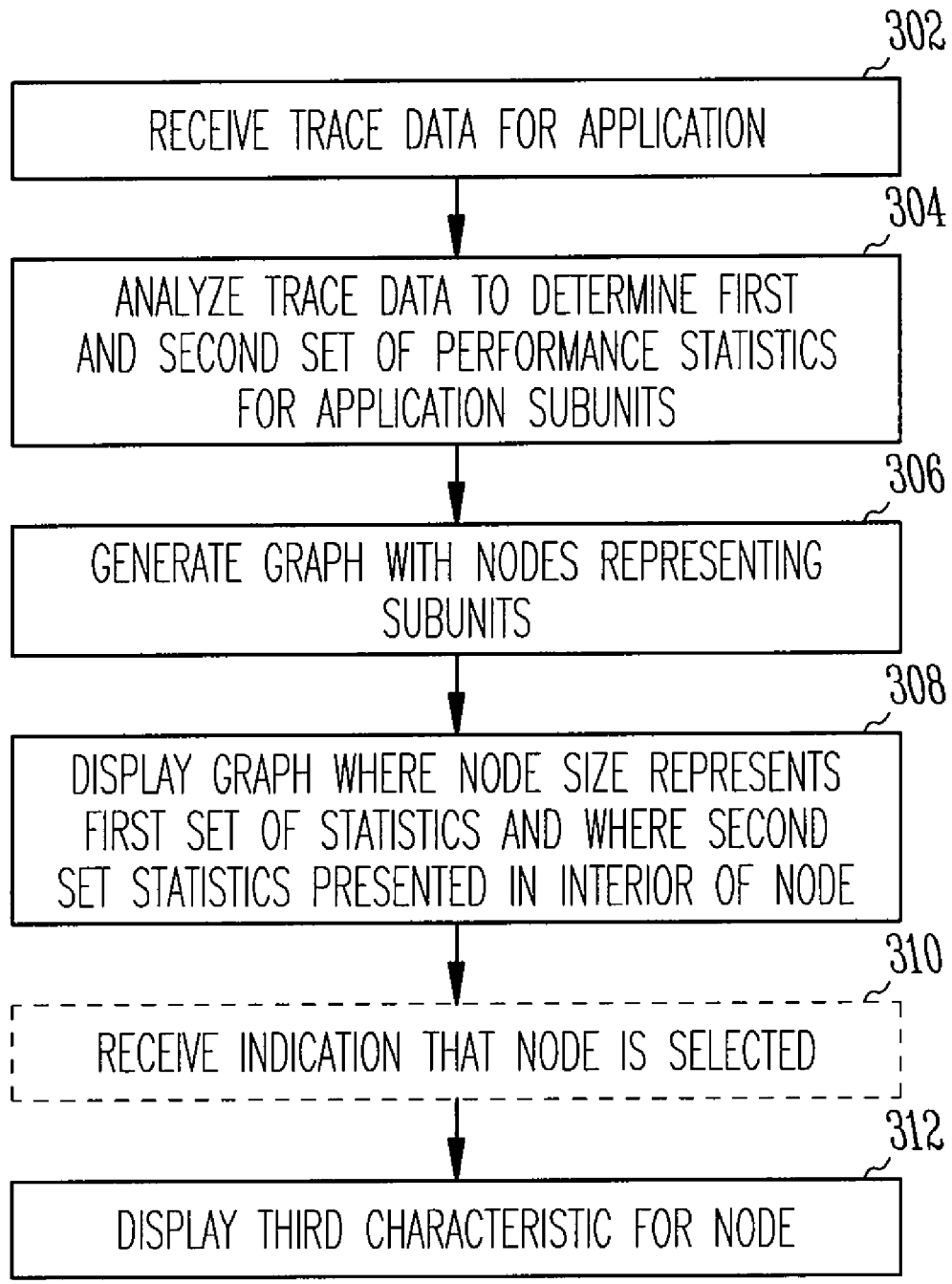
FIG. 3 is a flowchart illustrating an exemplary method for displaying application performance data according to example embodiments of the invention.

FIG. 3 is a flowchart illustrating example methods for displaying application performance data according to example embodiments of the invention. The methods to be performed by the operating environment constitute computer programs made up of computer-executable instructions. Describing the methods by reference to a flowchart enables one skilled in the art to develop such programs including such instructions to carry out the methods on suitable computers (the processor or processors of the computer executing the instructions from computer-readable media such as ROMs, RAMs, hard drives, CD-ROM, DVD-ROM, flash memory etc. The methods illustrated in FIG. 3 are inclusive of acts that may be taken by an operating environment executing an example embodiment of the invention.

The method begins at block 302 by receiving performance data for an application. As noted above, the performance data may include start times, end times, total times, or other time related data for a function, subroutine, or code region of an application. Further, the performance data may include hardware counters and/or other performance metrics associated with one or more function entry and/or exit points for an application such as cache misses, number of calls, TLB misses, I/O counters, message counters, message sizes and/or bandwidth metrics.

At block 304, a performance analysis tool analyzes the performance data, and determines at least a first set of statistics and a second set of statistics for one or more application subunits, such as functions, subroutines, or code regions within the application.

At block 306, the performance analysis tool generates a graph representing the execution path of the application, with nodes representing the various subunits.

At block 308, the performance analysis tools displays the call graph, where the node size represents a first set of statistics and wherein a second set of statistics is displayed in the interior portion of the node. For example, in some embodiments, the node height may represent a first time statistic such as an execution time of a code region while a node width may represent a second time statistic, such as an execution time that also includes child functions or subroutines executed. The statistics displayed in the interior of the node may include an average time, maximum time, minimum time across all processors or other statistics (hardware counters cache misses, number of calls, TLB misses, I/O counters, message counters, message sizes and/or bandwidth metrics) regarding the execution of the subunit represented by the node. The interior portion may be displayed as a bar graph, a pie chart, as text or any other manner that may be used to present statistics. In addition, other statistics may be presented besides time based statistics. For example, I/O (input output), memory usage, or other execution statistics that may be present in the performance data may be displayed.

At block 310, a performance analysis tool may receive, via a user interface, an indication that a particular node has been selected. The indication may be a point and click operation, or it may be an indication that a pointer cursor is "hovering" over the node. In some embodiments, the selection of a node may cause a third set of statistics to be displayed. For example a "tooltip" box may be displayed that provides detailed statistics regarding the execution of the subunit represented by the node.

Further, in some embodiments, at block 312 a node may be highlighted to indicate a characteristic of the node. For example, a node may be highlighted to indicate that the node is a hot spot, bottleneck, or that the node has some other execution characteristic. The highlighting may including highlighting the node in a different boundary or interior color, providing a blinking boundary or interior, providing a boundary having a different thickness, or any other mechanism known in the art for highlighting information.

Figure 4:
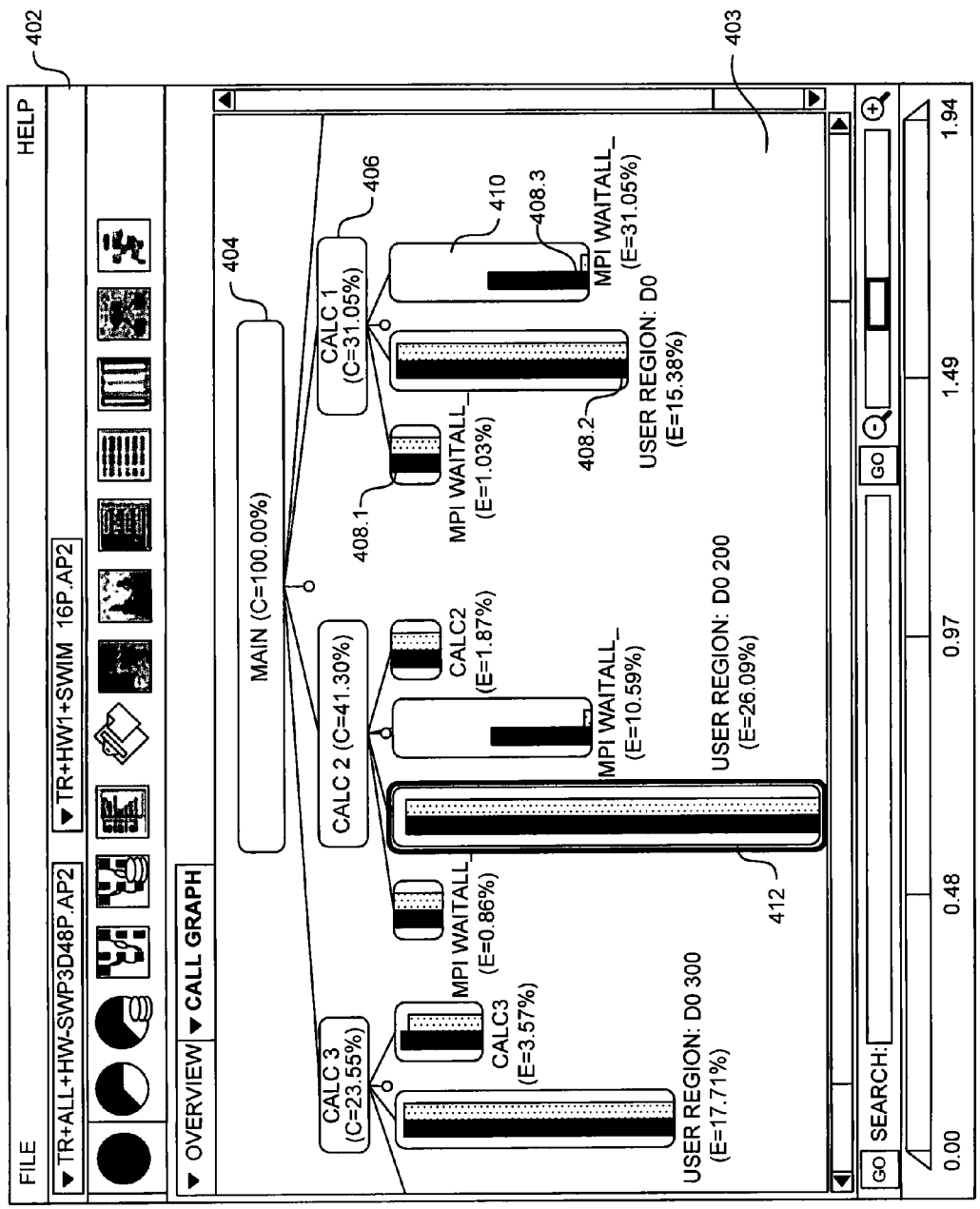
FIG. 4 is an example user interface screen according to embodiments of the invention.

FIG. 4 is an example user interface screen 402 according to embodiments of the invention. The example interface screen includes a call graph 403 including a plurality of nodes 404, 406, 408 that represent subunits of a computer application. The display is hierarchical. The first level of the hierarchy comprises the call graph 403. The call graph 403 may be expressed as a directed graph, which represents the path the program takes during execution. The nodes 404, 406 and 408 of the call graph are represented by rectangles. The dimensions of each node 404, 406 or 408, which represent a subunit such as a function, subroutine or a code region in the application, are a function of a particular metric, exemplified here with execution time. The height of the node represents the execution time of the subunit, not counting its children (exclusive time), and the width of the node represents the total execution time of the children (or children time). At the second level of the hierarchy, nodes 408 in the call graph may display a bar graph having one or more bars 410. In the example shown, the bars 410 are scaled according to the vertical height of the node, which at this level of the hierarchy indicates the maximum value for the same metric. The left bar corresponds to the average value across all processors, and the right bar corresponds to the minimum value from all processors. The border of the nodes can be highlighted as exemplified by border 412 to indicate hot spots based on another metric, providing a third level of the hierarchy. Finally, at the next level of the hierarchy, the performance visualization tool displays a full set of metrics on a "tooltip" (not shown), when the user places the mouse on top of a node or when the user selects a node.

As can be seen from the discussion above, various embodiments provide a call graph view, but with different interpretations depending on the level of the hierarchy that the user is considering. The hierarchical view provided in various embodiments may expose deeper previously hidden information in a way that allows the user to intuitively and quickly locate performance bottlenecks.

The Abstract is provided to comply with 37 C.F.R. §1.72(b) to allow the reader to quickly ascertain the nature and gist of the technical disclosure. The Abstract is submitted with the understanding that it will not be used to limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus the following claims are hereby incorporated into the Detailed Description, with each claim standing on its own as a separate embodiment.

The foregoing descriptions of specific embodiments of the present invention have been presented for purposes of illustration and description. The embodiments presented are not intended to be exhaustive or to limit the invention to the particular forms disclosed. It should be understood that one of ordinary skill in the art can recognize that the teachings of the detailed description allow for a variety of modifications and variations that are not disclosed herein but are nevertheless within the scope of the present invention. Accordingly, it is intended that the scope of the present invention be defined by the appended claims and their equivalents, rather than by the description of the embodiments.

What is claimed is:

1. A system comprising:
a set of performance data for an application with first performance statistics and second performance statistics; and
a performance visualization tool stored on a tangible machine-readable storage medium that when executed is operable to read the set of performance data and to display a call graph for the application, the call graph including a set of one or more nodes representing subunits of the application, wherein at least one node of the call graph has a size that varies based on the performance statistics of the performance data, the size of the at least one node represented by a width of the node that represents the first performance statistics and a height of the node that represents the second performance statistics, the width and the height of the node being represented by different performance statistics of the subunit.

2. The system of claim 1, further comprising an application instrumenter operable to insert instrumentation code in the application.

3. The system of claim 1, wherein the performance visualization tool includes a user interface operable to receive an indication that a node has been selected, and in response to the selection display third performance statistics.

4. The system of claim 3, wherein the third set of performance statistics are displayed in a tool tip box.

5. The system of claim 1, further comprising highlighting a node to indicate a performance characteristic derived from the performance data.

6. The system of claim 5, wherein the performance characteristic indicates that the node is a bottleneck node.

7. The system of claim 1, wherein third performance statistics are displayed as a bar graph.

8. The system of claim 1, wherein the second performance statistics include time statistics related to execution of the subunit across a plurality of processors.

9. The system of claim 8, wherein the time statistics include a minimum time, a maximum time and an average time.

10. A tangible computer-readable storage medium having computer executable instructions that when executed perform a method, the method comprising:
receiving performance data for a computer application having one or more subunits;

analyzing the performance data to determine at least a first set of one or more performance statistics and a second set of one or more performance statistics for the one or more subunits; and displaying a call graph having one or more nodes, wherein the one or more nodes correspond to the one or more subunits, and further wherein at least one node is displayed such that a size of the node varies based on the first set of performance statistics and the second set of performance statistics, the size of the at least one node represented by a width of the node that represents the first set of performance statistics and a height of the node that represents the second set of performance statistics, the width and the height of the node being represented by different sets of performance statistics of the subunit.

11. The tangible computer-readable storage medium of claim 10, wherein the method further comprises receiving an indication that a node has been selected, and in response to the selection displaying a third set of performance statistics.

12. The tangible computer-readable storage medium of claim 11, wherein the third set of performance statistics are displayed in a region separate from the node.

13. The tangible computer-readable storage medium of claim 10, wherein the method further comprises highlighting a node to indicate a performance characteristic derived from the performance data.

14. The tangible computer-readable storage medium of claim 13, wherein the performance characteristic indicates that the node is a bottleneck node.

15. The tangible computer-readable storage medium of claim 10, wherein the second set of performance statistics are displayed as a bar graph.

16. The tangible computer-readable storage medium of claim 10, wherein the second set of performance statistics include time statistics related to execution of the subunit across a plurality of processors.

17. The tangible computer-readable storage medium of claim 16, wherein the time statistics include a minimum time, a maximum time and an average time.

18. A tangible computer-readable storage medium having computer executable instructions that when executed perform a method, the method comprising: receiving performance data for a computer application having subunits, the performance data having a first set of performance statistics with a performance statistic for at least some of the subunits and a second set of performance statistics with a performance statistic for at least some of the subunits; and displaying a call graph having nodes that each correspond to a subunit, the call graph being displayed as a hierarchical representation of calls between the subunits, the size of the displayed nodes varying based on the performance statistics such that a width of a node indicates the performance statistic from the first set of performance statistics for the subunit that the node represents and a height of a node indicates the performance statistic from the second set of performance statistics for the subunit that the node represents, the width and height of the node being represented by different sets of performance statistics of the subunit, such that sizes of the displayed nodes vary based on the performance statistic for each node.

19. The tangible computer-readable storage medium of claim 18 wherein the performance data further having a third set of performance statistics with a performance statistic for at least some of the subunits and wherein the interiors of the displayed nodes include an indication of the performance statistic from the third set of performance statistics for the subunit that the node represents, such that each node indicates at least two performance statistics.

20. The tangible computer-readable storage medium of claim 18 wherein the performance data further having a third set of performance statistics with a performance statistic for at least some of the subunits and further comprising simultaneously displaying, for at least some of the displayed nodes, a bar graph for that displayed node indicating a performance statistic of the third set of performance statistics for the displayed node.

21. The tangible computer-readable storage medium of claim 20 wherein each displayed bar graph is displayed hierarchically below the displayed nodes whose performance statistic the displayed bar graph indicates.

* * * * *

UNITED STATES PATENT AND TRADEMARK OFFICE
CERTIFICATE OF CORRECTION

PATENT NO. : 8,286,135 B2
APPLICATION NO. : 11/874017
DATED : October 9, 2012
INVENTOR(S) : Luiz DeRose et al.

Page 1 of 1

It is certified that error appears in the above-identified patent and that said Letters Patent is hereby corrected as shown below:

In drawing sheets, sheet 3 of 4, figure 3, Reference Numeral 308, line 3, after "SET" insert -- OF --.

In column 4, line 35, after "etc." insert -- ). --.

In column 5, line 6, delete "(input output)" and insert -- (input/output) --, therefor.

In column 5, line 22, before "bottleneck," insert -- a --.

Signed and Sealed this
Twenty-fifth Day of December, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,286,135 B2 | Page 1 of 1 |
| APPLICATION NO. | : 11/874017 | |
| DATED | : October 9, 2012 | |
| INVENTOR(S) | : DeRose et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1213 days.

Signed and Sealed this
Seventh Day of October, 2014

Michelle K. Lee
*Deputy Director of the United States Patent and Trademark Office*